United States Patent [19]

Sternberg et al.

[11] Patent Number: 4,613,821

[45] Date of Patent: Sep. 23, 1986

[54] METHOD AND APPARATUS FOR OBTAINING HIGH ACCURACY SIMULTANEOUS CALIBRATION OF SIGNAL MEASURING SYSTEMS

[75] Inventors: Ben K. Sternberg; Richard W. Nopper, Jr., both of Ponca City, Okla.

[73] Assignee: Conoco Inc., Ponca City, Okla.

[21] Appl. No.: 457,045

[22] Filed: Jan. 10, 1983

[51] Int. Cl.⁴ .............................................. G01V 3/00
[52] U.S. Cl. ...................................... 324/323; 364/422
[58] Field of Search .................. 324/323, 334–337, 324/357, 74, 130; 364/422, 571, 576; 455/237

[56] References Cited

U.S. PATENT DOCUMENTS

| 2,974,224 | 3/1961 | Ule | 455/237 |
| 3,196,355 | 7/1965 | Berry et al. | 455/237 |
| 3,715,715 | 2/1975 | Ruehle | 364/576 |
| 3,746,978 | 7/1973 | Rogachev et al. | 324/334 |
| 4,225,851 | 9/1980 | Reschovsky et al. | 340/870.04 |

Primary Examiner—Ernest F. Karlsen
Assistant Examiner—Walter E. Snow
Attorney, Agent, or Firm—Charles E. Quarton

[57] ABSTRACT

Method and apparatus for high accuracy simultaneous calibration of electrical measuring systems wherein a calibration signal which has frequency spectra which interleave but do not interfere with the data spectra is injected into the electrical system during data acquisition to simultaneously correct for the response of the particular detection system. In a particular geophysical application, a calibration signal at a source system or receiver system, or both, is injected into each individual system as the data and calibration signals are measured so that an overall system response can be applied to the data signals in order to remove system response effects therefrom.

13 Claims, 14 Drawing Figures

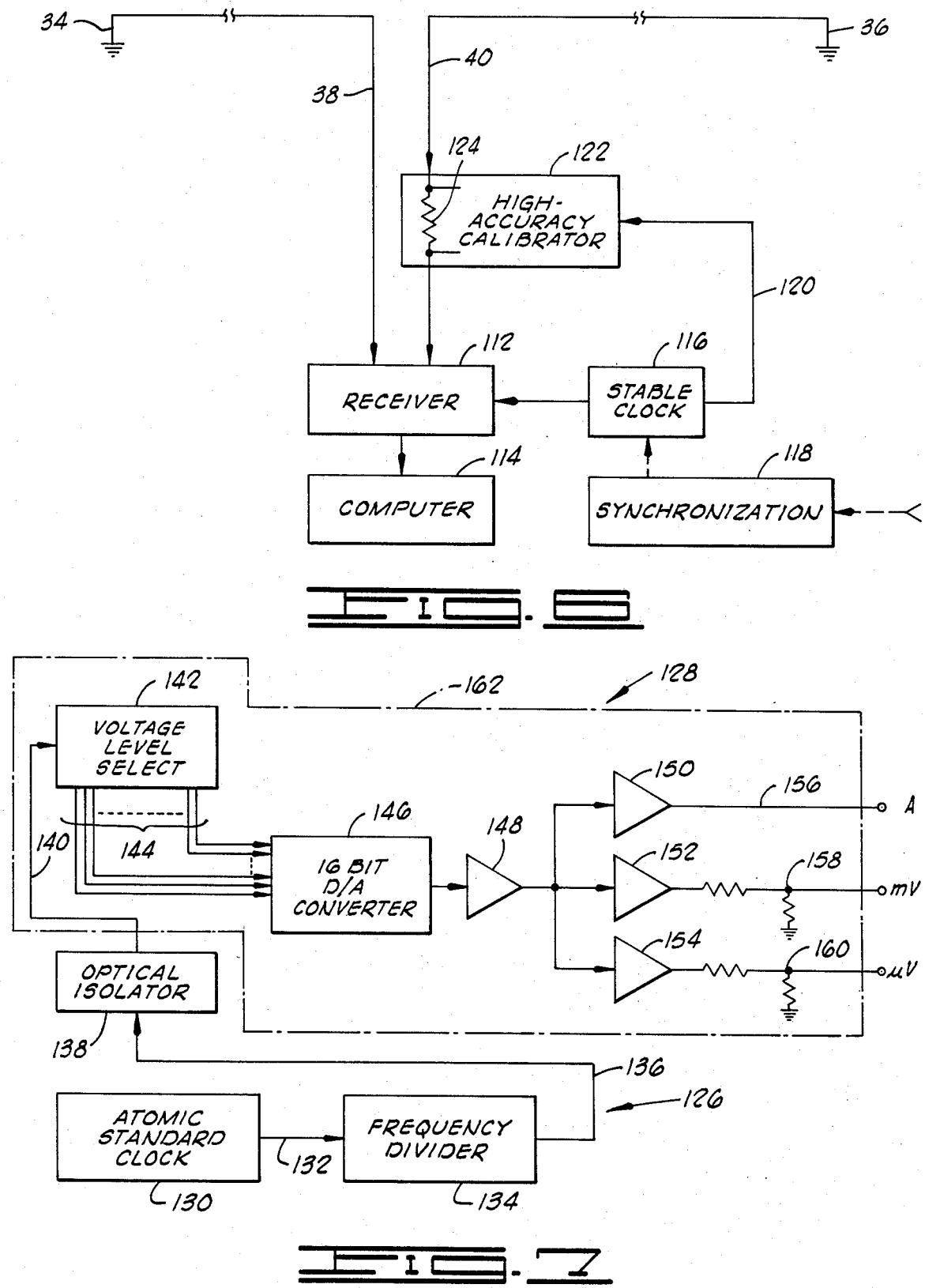

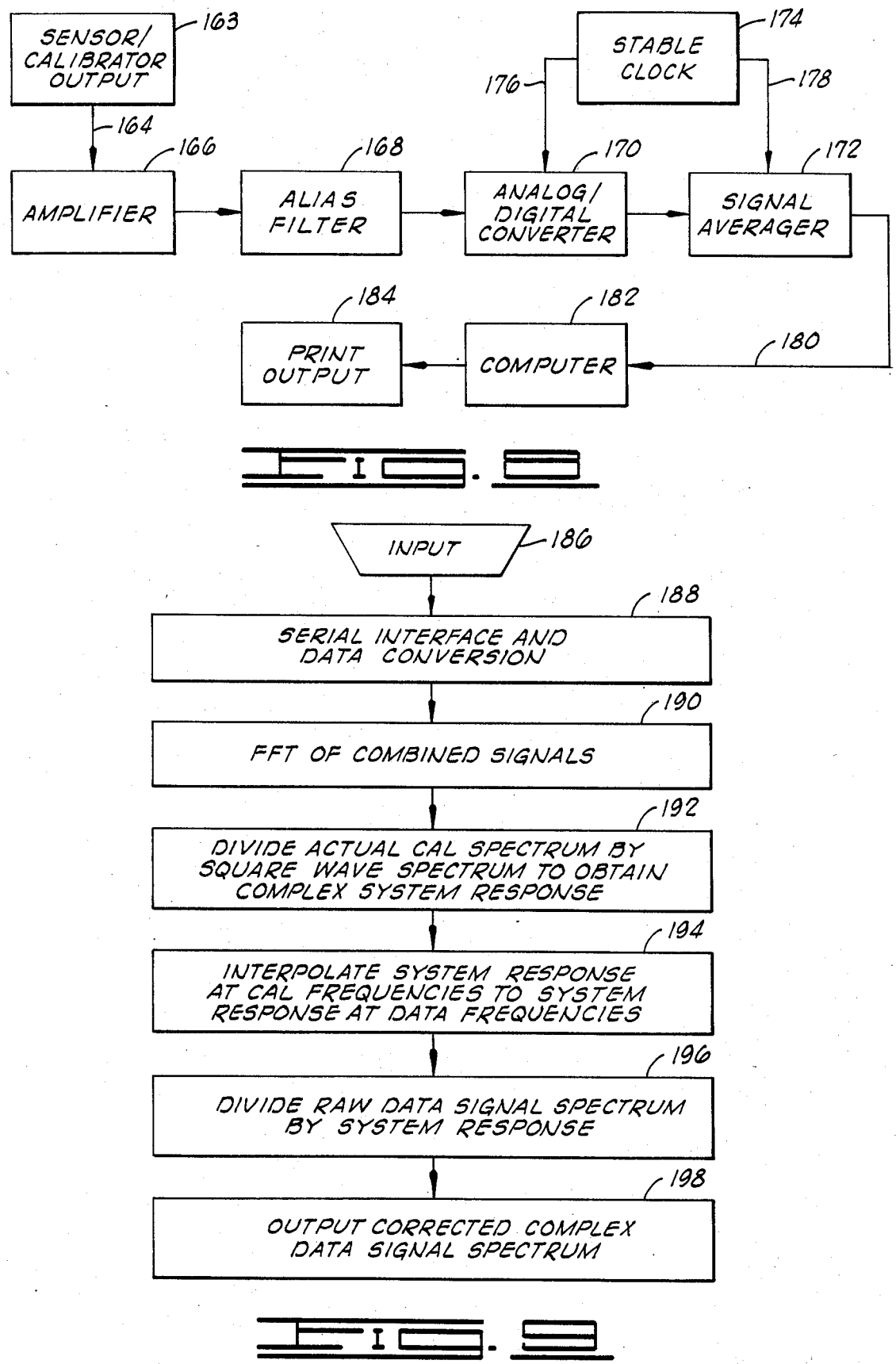

```
JL1601 RX
TODAY'S DATE: 16/07/81
NO. STACKS= 8
NO. FTS.   CHANNEL = 1024

FREQ.= .0625
    GAIN = 4

CALIBRATOR SETTING = .7161 G
NO. POINTS/CHANNEL= 1024
```

```
JL1601 RX  16/07/81
```

PEAK TO PEAK AMPLITUDE: .787200927734 VOLTS
TREND: .004577636719 VOLTS
PERCENT TREND: .581508044227 % OF PEAK TO PEAK

LINEAR TREND OF .004577636719 VOLTS REMOVED BY DETREND OPTION 2

JL1601 RX

CORRECTED SIGNAL * HARMONIC NO.

| | | | |
|---|---|---|---|
| 2 | | −1.7146909E+00 | 2.4763531E+00 |
| .1250000 | | 1.78666157E+00 | −3947.5 |
| | P | | A |
| 6 | | 1.1467912E+00 | 1.8620577E+00 |
| .3750000 | | 1.46701348E+00 | −5375.9 |
| | P | | A |
| 10 | | 1.2001424E+00 | 1.3027027E+00 |
| .6250000 | | −5.06648198E−01 | −6682.6 |
| | P | | A |
| 14 | | −5.0120917E−02 | 8.3463562E−01 |
| .8750000 | | −8.33129352E−01 | −7914.1 |
| | P | | A |
| 18 | | −4.5610499E−01 | 4.9198981E−01 |
| 1.1250000 | | −1.84451119E−01 | −9040.5 |
| P | | A | |
| 22 | | −1.0039211E−01 | 2.0484756E−01 |
| 1.3750000 | | 1.78560762E−01 | −10483.4 |
| | P | A | |

| HARMONIC NO. | REAL PART | AMPLITUDE |
| FREQUENCY | IMAGINARY PART | PHASE |

DC TERM= -.318202972412

FFT OF CALIBRATION

| Harmonic | Freq | Real | Imaginary | Amplitude | Phase |
|---|---|---|---|---|---|
| 1 | .0625000 | 8.6864139E-03 | 1.28415991E-01 P | 1.2870944E-01 | 1503.3 A |
| 3 | .1875000 | 8.5361739E-03 | 4.19277919E-02 P | 4.2787919E-02 | 1369.9 A |
| 5 | .3125000 | 8.7873319E-03 | 2.39356194E-02 P | 2.5497668E-02 | 1218.9 A |
| 7 | .4375000 | 8.4080644E-03 | 1.60340602E-02 P | 1.8104879E-02 | 1087.8 A |
| 9 | .5625000 | 7.8491460E-03 | 1.12683603E-02 P | 1.3732627E-02 | 962.4 A |
| 11 | .6875000 | 7.7144334E-03 | 8.11390800E-03 P | 1.1195891E-02 | 810.6 A |
| 13 | .8125000 | 7.2081589E-03 | 6.02638291E-03 P | 9.3954694E-03 | 696.3 A |
| 15 | .9375000 | 6.7461107E-03 | 4.10527899E-03 P | 7.8970454E-03 | 546.7 A |
| 17 | 1.0625000 | 6.4127841E-03 | 2.76779147E-03 P | 6.9845880E-03 | 407.5 A |
| 19 | 1.1875000 | 5.7848181E-03 | 1.66731873E-03 P | 6.0203050E-03 | 280.6 A |
| 21 | 1.3125000 | 5.2893280E-03 | 6.50533811E-04 P | 5.3291824E-03 | 122.4 A |
| 23 | 1.4375000 | 4.7256979E-03 | 1.78025224E-06 P | 4.7256982E-03 | .4 |

FFT OF RECEIVED SIGNAL

| Harmonic | Freq | Real | Imaginary | Amplitude | Phase |
|---|---|---|---|---|---|
| 2 | .1250000 | -2.8101025E-01 | -2.07140685E-01 P | 3.4910461E-01 | -2506.4 A |
| 6 | .3750000 | -4.0422430E-02 | 7.65091657E-02 P | 8.6531066E-02 | -4226.3 A |
| 10 | .6250000 | 3.1231676E-02 | 1.63545119E-02 P | 3.5254612E-02 | -5800.8 A |
| 14 | .8750000 | 8.4393930E-03 | -1.32763766E-02 P | 1.5731673E-02 | -7287.7 A |
| 18 | 1.1250000 | -5.2099413E-03 | -4.65791718E-03 P | 6.9805393E-03 | -8695.3 A |
| 22 | 1.3750000 | -1.2138832E-03 | 1.89787840E-03 P | 2.2528770E-03 | -10426.5 A |

```
SYSTEM RESPONSE, CALIBRATION FREQUENCIES
 1                    9.5270123E-03              1.4116486E-01
  .0625000            1.40943015E-01             1503.3
                 P                                         A
 3                    2.8086700E-02              1.4078573E-01
  .1875000            1.37955638E-01             1369.9
                 P                                         A
 5                    4.8188482E-02              1.3982559E-01
  .3125000            1.31259541E-0              1218.9
                 P                                         A
 7                    6.4552086E-02              1.3899842E-01
  .4375000            1.23099917E-01             1087.8
                 P                                         A
 9                    7.7478486E-02              1.3555400E-01
  .5625000            1.11229360E-01             962.4
                 P                                         A
11                    9.3070689E-02              1.3507270E-01
  .6875000            9.78901451E-02             810.6
                 P                                         A
13                    1.0277415E-01              1.3396090E-01
  .8125000            8.59243555E-02             696.3
                 P                                         A
15                    1.1098414E-01              1.2991883E-01
  .9375000            6.75383029E-02             546.7
                 P                                   A
17                    1.1956711E-01              1.3022847E-01
 1.0625000            5.16057976E-02             407.5
                 P                                   A
19                    1.2054786E-01              1.2545509E-01
 1.1875000            3.47446898E-02             280.6
                 P                              A
21                    1.2182488E-01              1.2274282E-01
 1.3125000            1.49832276E-02             122.4
                 P                         A
23                    1.1920926E-01              1.1920927E-01
 1.4375000            4.49081933E-05              .4
                 P                    A

INTERPOLATED SYSTEM RESPONSE, SIGNAL FREQUENCIES
 2                    1.8223991E-02              1.4097530E-01
  .1250000            1.39792418E-01             1441.2
                 P                                         A
 6                    5.7005169E-02              1.3941201E-01
  .3750000            1.27224678E-01             1149.6
                 P                                         A
10                    8.6022058E-02              1.3531335E-01
  .6250000            1.04450503E-01             881.8
                 P                                         A
14                    1.0689616E-01              1.3193986E-01
  .8750000            7.73391125E-02             626.3
                 P                                   A
18                    1.2029938E-01              1.2784178E-01
 1.1250000            4.32617467E-02             345.2
                 P                              A
22                    1.2078063E-01              1.2097604E-01
 1.3750000            6.87324577E-03             56.8
                 P                         A
```

METHOD AND APPARATUS FOR OBTAINING HIGH ACCURACY SIMULTANEOUS CALIBRATION OF SIGNAL MEASURING SYSTEMS

BACKGROUND OF THE INVENTION

1. Field of the Invention

The invention relates generally to method and apparatus for simultaneous calibration of electrical measuring systems and, more particularly, but not by way of limitation, it relates to improved procedures and equipment for geophysical prospecting wherein data measuring apparatus is continually determined as to calibration and accuracy simultaneous with measuring procedures.

2. Description of the Prior Art

The prior art includes numerous types of calibration procedure as applied to adjust measuring systems to some selected standard whereby reliable and consistent measurement results are achieved. In many signal measuring applications, the amplitude and phase response of the measuring system, i.e. including amplifiers, filters, cables, etc., is not uniform across the frequency spectrum and must be corrected in order to properly evaluate the measured data. In the past, very frequent and time-consuming calibrations might be performed, or alternatively, the measurement accuracy of the system would have to be sacrificed as less frequent calibrations would be made. For many low-frequency procedures, it is not practical to perform calibration runs after every measurement run; and the only way that routine measurements can be abided is to sacrifice accuracy in the final measurement results. Even with very frequent calibration runs, the drift of the system response during the course of a data run may determine the ultimate accuracy that can be obtained. Further, prior art procedures required a calibrated system response to be determined separately from prior data measurements, such that the separate procedures could not lend themselves to automation. To the applicants' knowledge, there is no prior art teaching directed to a similar approach to high-accuracy simultaneous calibration of an electrical measuring system.

SUMMARY OF THE INVENTION

The present invention relates to a method and apparatus for obtaining a high-accuracy determination of the frequency response, therefore the calibration, of a signal measuring system, which calibration can be performed simultaneously with data acquisition by the system. The invention further performs automatic correction of the acquired data for the system response as determined by the calibration procedure. The procedure involves the injection of a calibration signal that has a precisely known Fourier transformed discrete complex spectrum into the measuring apparatus along with the data signal. The data signal has a different complex spectrum from that of the calibration signal, and is interleaved with the calibration signal complex spectral components.

Thus, a calibration signal of very accurately known amplitude and phase characteristics is injected into the signal measurement system along with the data signal presently being measured. The calibration signal is designed such that its discrete Fourier transform, which is a complex spectrum consisting of discrete spectral lines for amplitude and for phase (frequency domain), interleaves with the components of the data signal complex spectrum, thus giving no cross-contamination when the combined signals are transformed. Since the waveform of the calibration signal is accurately known, so then is the ideal discrete Fourier transform of the calibration signal; thus, the actual complex frequency response of the measuring system is determined at those frequencies by dividing the actual measured spectrum by the ideal spectrum function of the calibration signal. Assuming a smoothly varying system response function, the complex system response at the calibration signal frequencies is interpolated to that at the frequencies corresponding to the data signal. The response is then removed automatically from the data signal spectrum by dividing the complex data signal spectrum by the interpolated complex system response function, i.e. by dividing respective amplitudes and subtracting respective phases. The corrected data signal spectrum may then be used for interpretation, or, other applications may require that the corrected spectrum be Fourier transformed back into the original time domain for further interpretation.

Therefore, it is an object of the present invention to achieve a high-accuracy calibration of a signal measurement system simultaneously with data acquisition.

It is also an object of the present invention to provide a signal measurement system calibration procedure that eliminates the time periodically required to obtain a standard degree of accuracy.

It is still further an object of the present invention to provide calibration apparatus which automatically corrects the data for a measured system frequency response.

Finally, it is an object of the present invention to provide a calibration procedure that saves considerable time over traditional calibration approaches, and that assures that the most current and accurate possible calibration of the measuring system is in effect.

Other objects and advantages of the invention will be evident from the following detailed description when read in conjunction with the accompanying drawings which illustrate the invention.

BRIEF DESCRIPTION OF THE DRAWINGS

FIG. 6 is a block diagram of an electrical field detection apparatus such as may be utilized in the field measurement system of FIG. 1;

FIG. 7 is a block diagram of a stable clock and high-accuracy calibrator as employed in the present invention;

FIG. 8 is a block diagram of receiver and computer as utilized in the present invention;

FIG. 9 is a flow diagram illustrating computation and processing steps as effected in the present invention.

DETAILED DESCRIPTION OF THE INVENTION

Figure 1:
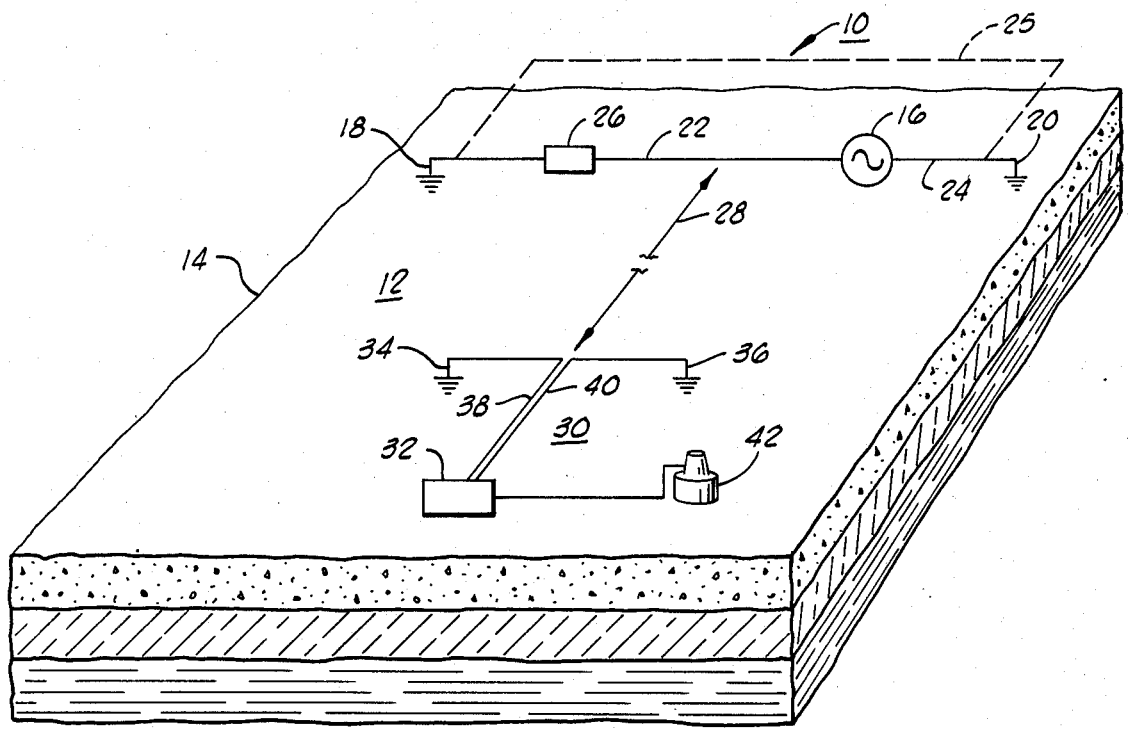
FIG. 1 is a perspective view in idealized form of an earth sector including an electrical methods controlled-source field measurement system layout.

The high-accuracy simultaneous calibration procedure of the present invention has been developed for use in an electrical methods controlled-source field measurement system such as field measurement system 10 as illustrated in FIG. 1. FIG. 1 shows the general field layout on surface 12 of an earth sector 14. Thus, a controlled source, 16, e.g. a 200 kilowatt generator, delivers an alternating, approximately square wave current to two grounded current electrodes 18 and 20 which are widely separated, on the order of several tens to several thousands of meters. The source 16 is series-fed to the respective electrodes 18 and 20 by respective conductors 22 and 24, and a current monitor station 26 is connected in conductor line 22 for the purpose of analyzing the current waveform being delivered between electrodes 18 and 20 for derivation of replica data.

The wires 22 and 24 along with electrodes 18 and 20 form an electric dipole. Alternatively, a magnetic dipole source may be used by conducting the return current in conductor 25 instead of through the earth via electrodes 18 and 20.

At considerable distance indicated by arrow 28, typically on the order of kilometers, a receiving area 30 is set up to record and analyze the electric and/or magnetic field components generated by the source. Thus, a receiving station 32 is utilized to record electric field data from a pair of spaced potential electrodes 34 and 36 as connected by respective input conductors 38 and 40. Also, magnetic field data may be detected by magnetometer 42 for processing in receiver station 32. The amplitude and phase of the received data are interpreted using various modeling techniques in order to gain electrical response information about the structure of the earth in the survey area.

The present calibration procedure provides high-accuracy, automatic, and simultaneous correction for frequency response of the measuring system continually during operation. The system response is subject to significant drift due to aging of components, changing ambient temperatures, etc., so that obtaining high-accuracy measurement requires continual updating of calibration, or even better, automatic and simultaneous calibration. In particular, at the source end of the field measurement system of layout 10, the electrical characteristics of the circuit formed by electrode conductor cables 22 and 24 and electrodes 18 and 20, as well as the individual responses of current monitor 26 and current generator 16 are continually varying and require continual allowance in deriving high-accuracy output measurements. Likewise, the electrical characteristics of the circuit formed by conductors 38 and 40 and electrodes 34 and 36 along with the instrument electronics within receiver station 32 also exhibit a separate system response at the receiver area, and this response too is accounted for by simultaneous calibration at receiver area 30. As will be further described, a separate simultaneous calibration procedure can be carried out for each of the electric and magnetic field detection systems.

In the field measurement system of FIG. 1, the transmitted waveform from current generator 16 must be known accurately so that a received signal can be later referred to it, and so that the relative amplitudes and phases can be determined and interpreted by various of the known modeling techniques. Thus, the complete simultaneous calibration method of the invention is applied separately to each of the individual signal processing stations; that is, in processing the replica signal from current monitor 26, and in processing both the received electrical field signal, and the received magnetic field signal at receiver station 32. The multiple sets of resulting data may then be later combined to derive subsequent interpretation of the data to derive more meaningful geologic information.

Figure 2:
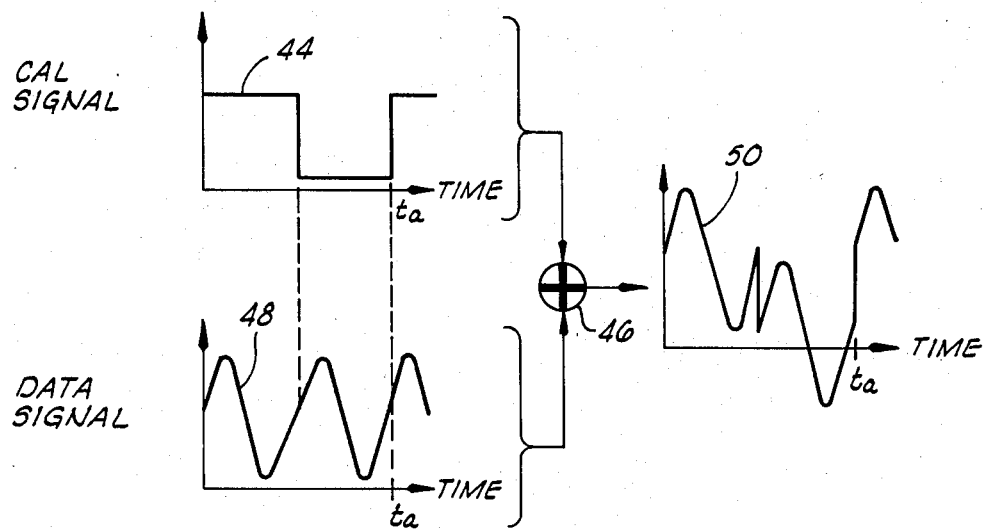
FIG. 2 is a graphic depiction in amplitude versus time of the summation of a representative calibration signal and data signal.

Referring to FIG. 2, the method of the present invention consists of injecting a calibration signal, hereinafter referred to as a "CAL" signal, of very accurately known characteristics into the signal measurement system along with the signal being measured, i.e. the data signal. In the time domain, the square wave CAL signal 44 is summed through summing junction 46 with the data signal 48 and, as illustrated, there is output a time domain summed signal 50. Thus, the time domain signal 50 is a straight summation of amplitude over the averaging period $t_a$, and is repetitive at that period.

Figure 3A:
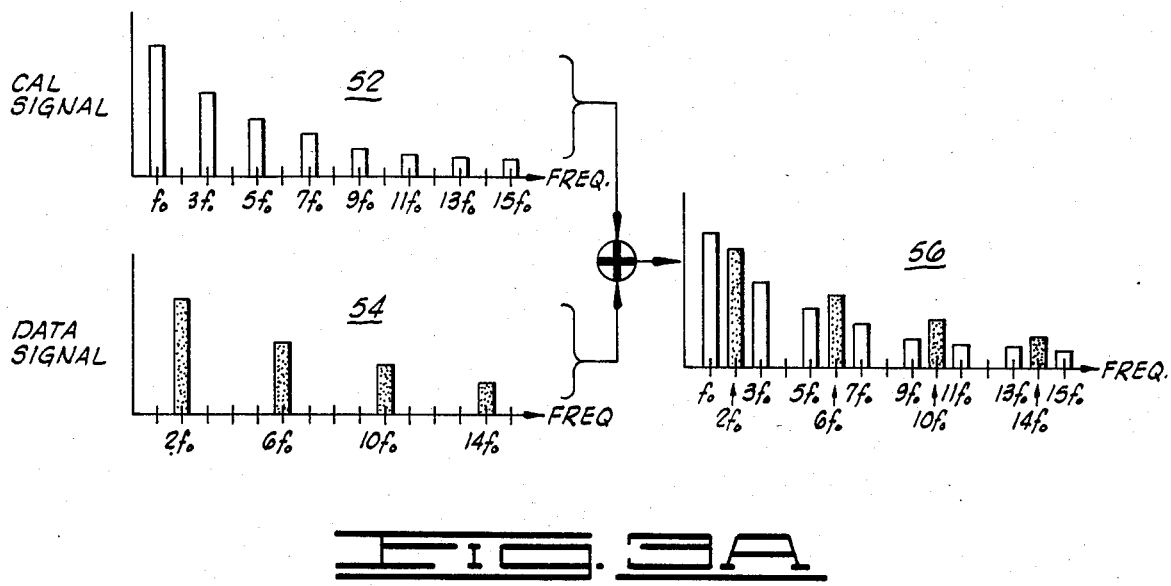
FIG. 3A is a graphic depiction of the summation of amplitude spectra of a representative calibration signal and data signal.
Figure 3B:
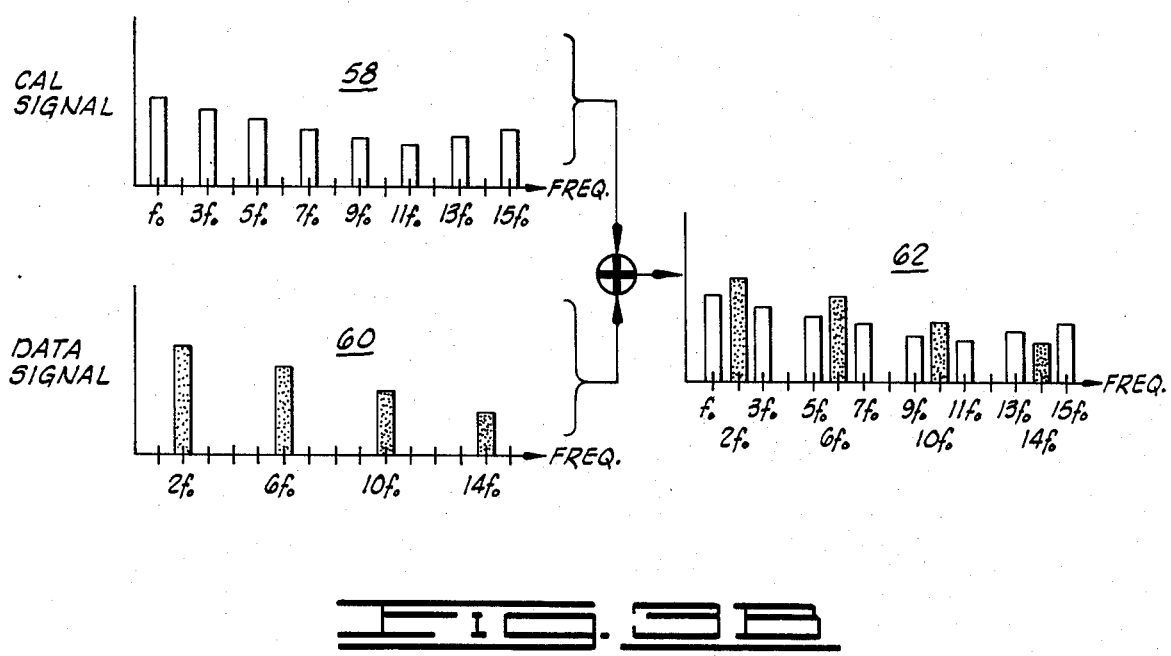
FIG. 3B is a graphic depiction of the summation of phase spectra of a representative calibration signal and data signal.

The CAL signal is designed or selected such that its discrete Fourier transform, which is a complex spectrum consisting of discrete spectral lines for both amplitude and phase, will interleave with the like spectral lines of a Fourier transform of the data signal. Thus, there is no cross-contamination when the combined signal, (i.e. the CAL and data signal) undergoes Fourier transformation. FIG. 3A illustrates the spectral line distribution for amplitude spectra of the CAL signal and data signal after summation and Fourier transformation. FIG. 3B illustrates the phase spectra for the same CAL and data signals. In FIGS. 3A and 3B, the CAL signal frequency $f_o$ is selected to be one-half the data signal frequency $2f_o$ and the progression of odd harmonics constitutes a square wave CAL signal for injection into the data signal.

In summing the CAL and data signals in the time domain, (FIG. 2) then in effect, the CAL signal amplitude spectrum or spectral line distribution 52 is summed with the data signal amplitude spectral line distribution 54 to yield the non-interfering amplitude spectral line distribution 56 of the combined CAL and data signal. In like manner, summation of the CAL and data signals yield the CAL signal phase spectral distribution 58 and data signal phase spectral distribution 60 as summed to produce a non-interfering phase spectral line distribution 62.

Since the characteristics of the CAL signal are precisely known, so then is its ideal discrete Fourier transform. Thus, the actual complex frequency response of the measuring system is determined at those frequencies by dividing (complex number division) the actual spectrum function of the actual measured CAL signal by the ideal spectrum function of the CAL signal. Assuming a smoothly varying system response function, the complex system response at the CAL signal frequencies may then be interpolated to that at the frequencies corresponding to the data signal. The response as interpolated is then removed automatically from the data signal spectrum by dividing the complex data signal spectrum by the complex system response function, i.e. by dividing respective amplitudes and subtracting the respective phases.

Figure 4:
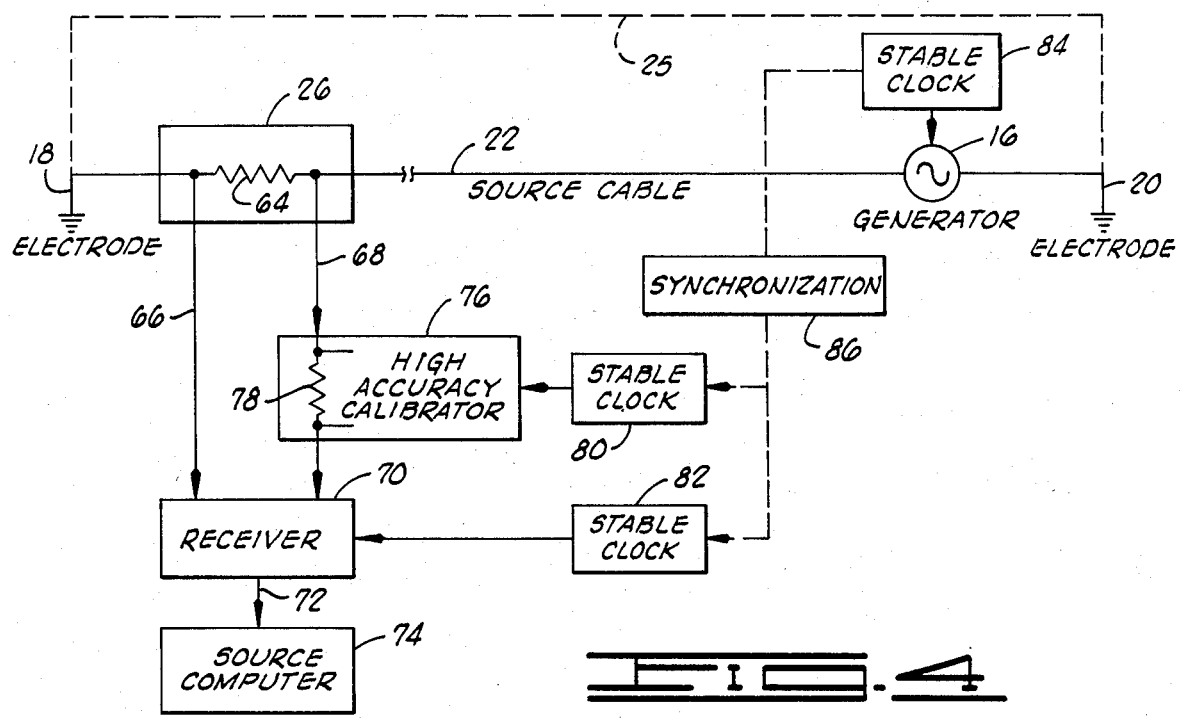
FIG. 4 is a block diagram of source apparatus as may be utilized in a field measurement system such as that of FIG. 1.

FIG. 4 illustrates connection of calibration apparatus at the source end of an electrical methods measuring system. An output replica of the generated current signal as input to the earth is developed across a precision shunt resistor 64 in current monitor 26, and the output signal is transmitted via conductors 66 and 68 for input to a microprocessor-controlled receiver 70. The receiver 70 is a specialized, microprocessor-controlled receiver that receives input current monitor signal and amplifies, filters, digitizes and averages the waveform for output via line 72 to a desk top computer 74. The microprocessor-controlled receiver 70 may be such as a Model GDP-12 Zonge receiver that is commercially available from Zonge Engineering and Research Organization of Tucson, Ariz. A suitable computer for use as source computer 74 is the Model HP9845 that is commercially available from Hewlett-Packard Corporation of Palo Alto, Calif.

The CAL signal having precisely known frequency characteristics is generated in a high-accuracy calibrator 76 for injection across a series-connected resistor 78, which is a precision resistor, series-connected in input line 68 to receiver 70. The high-accuracy calibrator 76 receives timing control from a stable clock circuit 80. The receiver 70 is also controlled by timing input from a stable clock circuit 82, and the current generator 16 is controlled under timing control from a stable clock 84, and all of the stable clock circuits 80, 82 and 84 are under control of a central synchronization connection 86. The specific circuitry for high-accuracy calibrator 76 and a selected form of stable clock will be discussed further below in connection with FIG. 7.

During operation of the source circuitry of FIG. 4, the high-power current generator 16 inputs a current waveform to the earth as replica signal is derived from precision shunt resistor 64 for input to receiver 70. The CAL signal from high-accuracy calibrator 76 is applied to a low-resistance precision resistor 78 for insertion directly in the line from shunt resistor 64. The CAL signal is triggered by a clock 80 in sychronism with a clock 82 controlling receiver 70 as well as the generator clock 84.

Figure 5:
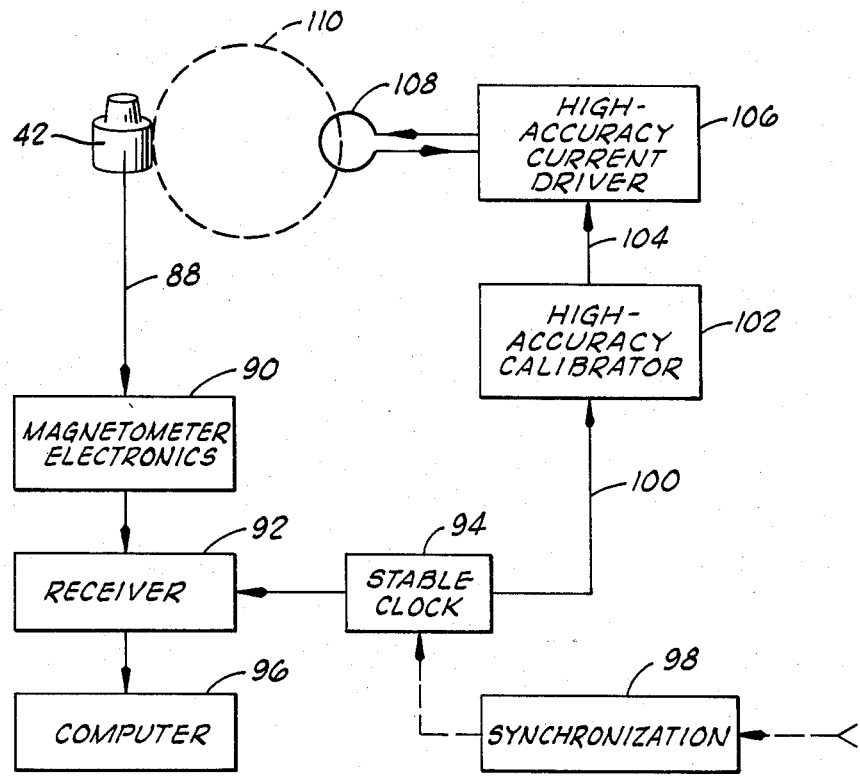
FIG. 5 is a block diagram of magnetic detection apparatus such as may be used in the field measurement system of FIG. 1.

FIG. 5 illustrates a similar form of CAL signal control circuitry as illustrated for use with the magnetometer 42 as may be sensing the magnetic field at a receiver location due to the source. The magnetometer 42 provides sensor input via lead 88 through the associated magnetometer electronics 90 for input to a receiver 92, e.g. a microprocessor-controlled receiver such as the Zonge receiver, Model GDP-12. The receiver 92 is controlled by a stable clock 94 which is maintained in synchronization with stable clocks at the source. Output from receiver 92 in digitized and averaged form is then output to a computer 96 (e.g. HP 9845) which performs the various steps of high-accuracy simultaneous calibration processing to determine and account for the system response of the magnetometer receiver station.

The stable clock 94, as controlled from a general synchronization source 98, provides timing input on conductor 100 to control a high-accuracy calibrator 102 that provides CAL signal output on line 104 to a high-accuracy current driver 106 driving a calibration coil 108. The coil 108 has precisely known dimensions and is disposed at an accurately known position relative to the magnetometer 42, so that the magnetic field from the coil 108 at magnetometer 42 can be calculated accurately for introduction into subsequent computations within computer 96. The magnetometer 42 simultaneously senses the data signal from the earth medium as transmitted from source electrodes 18 and 20, as well as the CAL signal as introduced via known magnetic field 110. The stable clock 94 is maintained in synchronization with the stable clocks 82, 80 and 84 at the source so that the phase of the received signal relative to that of the calibrated current monitor 26 can be determined.

FIG. 6 illustrates similar calibration circuitry as used with the electric field receiver system. The potential sensing electrodes 34 and 36 provide input signal as carried by input conductors 38 and 40 to the receiver 112 which outputs digitized and averaged data to computer 114. The receiver 112 and computer 114 are the same type as those specified in use at the prior stations, and receiver 112 is similarly controlled from a stable clock 116 as centrally controlled from a synchronization source 118. Timing output from stable clock 116 is also applied on conductor 120 for timing control of a high-accuracy calibrator 122, as will be further discussed. The CAL signal generated in high-accuracy calibrator 122 is injected across a low-resistance precision resistor 124 that is connected in series in sensor input line 40 to receiver 112. Output from receiver 112, including both data and CAL signal, may then be processed in computer 114 to distinguish between data and CAL signals and to determine the complex system response for the receiver installation functioning with potential electrodes 34 and 36.

Referring now to FIG. 7, there is shown a representative form of stable clock 126 and high-accuracy calibrator 128. These circuits are interchangeable with those similar designations in FIGS. 4, 5 and 6. The stable clock 126 may consist of such as an atomic standard 130 providing basic timing output on conductor 132 to a frequency divider 134. The atomic standard, e.g. rubidium or cesium beam type, may be capable of maintaining frequency accuracy to one part in $10^{11}$ for long periods of time, on the order of a month. Alternatively, the standard 130 may consist of quartz crystal oscillators as used with more frequent reference to a standard clock. Clock output on lead 132 is typically at 10 megahertz as input to a frequency divider 134. Divider 134 may be composed of binary or decade counter chips in well-known manner to provide countdown to produce a low-frequency output (e.g. from 0 to 250 hertz, square wave fundamental) on lead 136 as buffered through an optical isolator 138 to provide timing input 140 to the Voltage Level Select 142.

A thumb wheel switch 142 providing digital signals on output lines 144 is applied as input to a 16 bit digital-to-analog converter 146. The converted analog output from converter 146 is then conducted through a buffer 148 for input to each of the output amplifiers or current drivers 150, 152 and 154. The amplifier 150 provides up to a two ampere output on conductor 156 as may be applied to energize a calibration coil 108 (FIG. 5); output amplifier 152 conducts through a divide by 100 resistor network 158 that provides a millivolt output as may be utilized for calibration of current monitor 26 and input resistor 78 at a source station (FIG. 4); and, the output amplifier 154 conducts through a divide by 10,000 resistor network 160 to provide a microvolt output which may be used to calibrate the electrical receiver calibrate input resistor 124 (FIG. 6).

The calibrator 128 is presently designed to output a square wave with amplitude accuracy of 0.0015% and phase accuracy of 1 milliradian up to 250 hertz operating frequency. A temperature stabilizing oven 162 houses the digital-to-analog converter 146 and output amplifier system to maintain oven control at plus or minus 1° F.

A square waveform was selected as CAL signal because its discrete spectrum contains only odd harmonics which decrease relatively slowly, i.e. as a function of 1/(harmonic number), so that as many harmonics as possible may be analyzed. Other waveforms may also be used, however, with no change in the procedures described herein. The fundamental CAL signal frequency $f_o$ was chosen to be one-half the frequency of the data signal, i.e. the output of the source generator. The listing of data and CAL signal frequencies in the amplitude and phase graphs of FIGS. 2A and 2B summarize the relationship of harmonics.

Noting FIGS. 2A and 2B, the data signal has components at $2f_o$, $6f_o$, $10f_o$, ..., if it is a perfect square wave. For an arbitrary repetitive data waveform, additional components appear generally spaced at $4f_o$, $8f_o$, $12f_o$, ... However, these components still do not interfere with the CAL signal components so that the calibration procedure is still effective with non-symmetrical waveforms. If the data signal is not a strictly periodic waveform, for example containing noise, then it is possible, in taking the discrete Fourier Transform of the combined signals, that a small amount of contamination of the CAL signal components could occur. In practice, this contamination can be reduced to acceptably small levels by increasing the amplitude of the CAL signal relative to that of the data signal.

It should be noted that various other combinations of CAL and data signal frequencies will accomplish the same result, i.e. interleaved and non-interfering line spectra. The choice of fundamental CAL frequency equal to one-half the fundamental data frequency is most convenient, but it should be understood that the invention is not restricted to this choice.

FIG. 8 illustrates processing flow through a receiver and computer at one of the source or receiver stations. Thus, a sensor/calibrator output 163 includes data signal with injected CAL signal on input line 164 to receiver amplifier 166. The amplified signal is then applied through a receiver alias filter 168 for input to an analog/digital converter 170 and a digital signal averager 172. The converter 170 and averager 172 are under control of a stable clock 174, e.g. stable clock 126 of FIG. 7 providing the designated clock frequency output on leads 176 and 178. Stacked or averaged signal output on line 180 is then input to a computer 182 of the general type previously discussed, and calibration processed data is then output at print output 184 for use in final data interpretation and/or further data processing.

The averaged CAL and data signal output on lead 180 is processed in computer 182 in accordance with the flow diagram of FIG. 9. Thus data input at input 186 is applied through a serial interface and converted to compatible format in flow stage 188. In the next flow stage 190, the combined data and CAL signals are fast Fourier transformed, i.e. FFT, to yield output of the interleaving complex line spectra for both amplitude and phase for each of the data and CAL signals. Proceeding then to flow stage 192, the actual FFT of the CAL signal is divided by the FFT of an ideal square wave of specified characteristics, the resulting quotient yielding the complex spectrum or system response function of the entire measuring system at the frequencies of the CAL signal.

An assumption is then made that the system response is a smooth function of frequency, and in flow stage 194 the response at the interleaved frequencies corresponding to the data signal are determined by a polynomial interpolation routine. Proceeding to flow stage 196, the interpolation derived system response at the data frequencies is then divided into the original data signal FFT as previously derived in flow stage 190, and flow stage 198 outputs the corrected data signal complex spectrum, i.e. the data signal amplitude and phase values in the frequency domain as corrected for the system response at the particular signal processing installation.

FIGS. 10A through 10D illustrate a print output list of the complete high-accuracy simultaneous calibration procedure. In the printout list of FIGS. 10A-D, the data and CAL inputs were derived from an electric dipole source as recorded at a magnetic sensing receiver station such as that shown in FIG. 5. Complex spectra throughout are given both as real and imaginary parts, as well as amplitude and phase components.

Figures 10A, 10D:
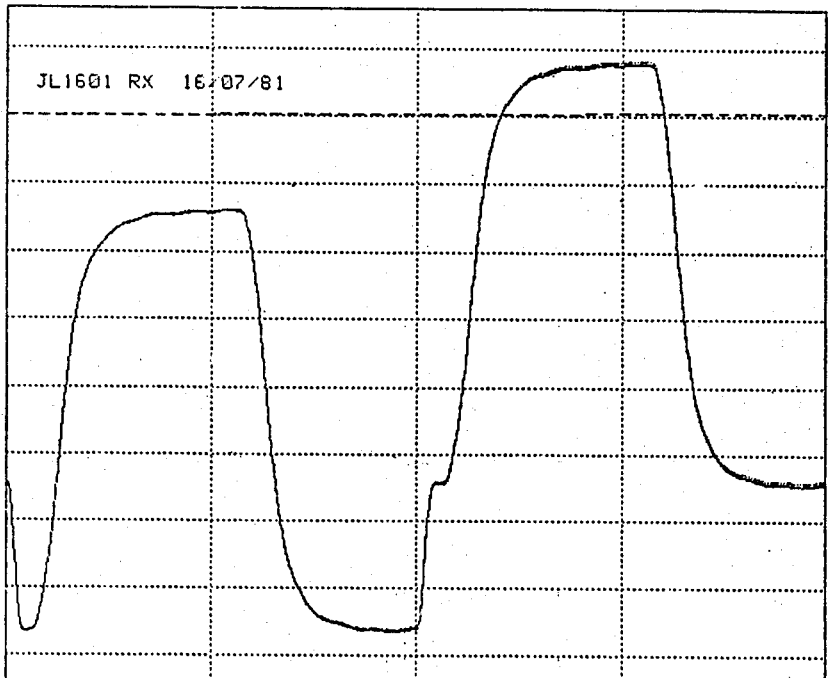
FIGS. 10A, 10B, 10C and 10D illustrate in computer list-out form the automatic simultaneous calibration procedure of the present invention.
Figure 10B:
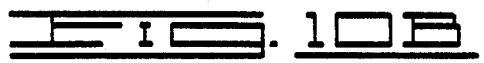

FIG. 10A illustrates a printout with header information relating to input data and parameters and the several calibration settings as applied to the depicted raw input data as formatted in flow stage 188. FIG. 10B illustrates a succeeding listout of FFT data for the combined signals. Thus, the FFT data of the calibration signal is first listed with both harmonic number and frequency shown on the lefthand column, with the middle column listing real and imaginary parts, and with the right column listing amplitude and phase of the complex signals. The lower portion of FIG. 10B illustrates the FFT listout of the received or data signal with all similar parts listed in the respective columns. Overlaying the data for both the CAL and data FFTs are a graphic trend indication for both phase and amplitude as shown by the downward progression of P's and A's for each of the calibration and data FFT listouts.

Figure 10C:

The upper portion of FIG. 10C lists the operation of flow stage 192 wherein the actual CAL spectrum is divided by an ideal square-wave spectrum to obtain the complex system response. The system response and calibration frequencies are again shown in a three column listing of frequency and harmonic, real and imaginary parts, and amplitude and phase components. Also, the graphic trend pattern of P's and A's are overlaid. The lower portion of FIG. 10C illustrates the operation of flow stage 194 to interpolate the system response at CAL frequencies in order to derive a system response at data frequencies. The interpolated signal frequency system response is listed out in similar three-column manner with graphic phase P and amplitude A trends in overlay.

Finally, FIG. 10D lists out the result of flow stages 196 and 198 to provide the corrected data signal spectrum for each harmonic and frequency illustrating both real and imaginary components of the complex spectrum. Here again, phase P and amplitude A graphic trends as corrected are printed in overlay.

The foregoing discloses a novel calibration procedure for electrical measuring systems which assures high-accuracy calibration, calibration simultaneous with data acquisition, and automatic correction of output measurement data. The procedure of the present invention may be reliably utilized on diverse types of electrical measurement signal while employing calibration signals of differing frequencies and wave shape to enable calibration signal correction. While the foregoing is described with particular reference to an electromagnetic field measuring system, it should be fully understood that the similar calibration technique can be employed simultaneous with signal acquisition or signal generation in any of various geophysical prospecting systems. Thus, such as seismic surveying, seismic borehole logging, marine seismic applications, and the like may use the simultaneous calibration system, and still other radar applications, telemetry, and various other data signal propagation methods can benefit from the teachings.

This technique is also applicable in other areas of physics, chemistry, biology, and engineering where measurements of the characteristics of a single or repetitive well-defined waveform are made.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A system for calibration of an electrical data signal measurement indication simultaneous with data signal acquisition, comprising:
   means for acquiring said data signal;
   means for injecting a calibration signal into the data signal that has interleaving and non-interfering amplitude and phase spectra relative to the data signal in the frequency domain, and that has precisely known frequency characteristics;
   means for processing the combined data signal and calibration signal to derive a precisely corrected complex data signal spectrum in the frequency domain; and
   means for Fourier transforming said corrected complex data signal to a corrected data signal in the time domain.

2. A system for calibration of an electrical data signal measurement indication simultaneous with data signal acquisition, comprising:
   means for acquiring said data signal;
   means for injecting a calibration signal into the data signal that has interleaving and non-interfering amplitude and phase spectra in the frequency domain, and has precisely known frequency characteristics; and
   means for processing the combined data signal and calibration signal to derive a precisely corrected complex data signal spectrum in the frequency domain,
   said means for processing further comprising:
   means for Fourier transforming the combined data signal and calibration signal to obtain the data complex spectrum and the calibration complex spectrum;
   means for dividing the calibration complex spectrum by an ideal calibration complex spectrum to obtain the complex system response;
   means for interpolating the complex system response at calibration frequencies to a complex system response at data signal frequencies; and
   means for dividing the data complex spectrum by the interpolated data signal complex system response to obtain a calibration corrected data signal complex spectrum.

3. Apparatus for simultaneous calibration of an electrical measuring system, comprising:
   means sensing an electrical data signal and providing a data signal input;
   means generating and injecting into said data signal input an electrical calibration signal of known frequency that will exhibit a non-interfering complex spectrum relative to the data signal complex spectrum;
   means for Fourier transforming the combined data signal input and calibration signal;
   means processing the calibration signal Fourier transform to develop a system response;
   means interpolating said system response to the frequency of said data signal;
   means correcting said data signal in accordance with the interpolated data signal system response; and
   means outputting calibration corrected electrical measurement data.

4. A method for simultaneous calibration of a geophysical prospecting system comprising:
   generating a source signal of selected frequency for input to an earth medium;
   detecting a source input replica electrical data signal;
   injecting a calibration signal of precisely known frequency into the replica data signal, said calibration signal having amplitude and phase spectra in the frequency domain which are interleaving and non-interfering with the amplitude and phase spectra of the replica data signal in the frequency domain;
   processing the combined replica data signal and calibration signal to derive a source system response;
   correcting the source input replica data signal in accordance with said system response indication,
   detecting a received data signal from said earth medium at a selected location from said source signal input;
   injecting a calibration signal of precisely known frequency into the received data signal, said calibration signal having amplitude and phase spectra in the frequency domain which are interleaving and non-interfering with the amplitude and phase spectra of the received data signal in the frequency domain;
   processing the combined received data signal and calibration signal to derive a receiver system response; and
   correcting the received data signal in accordance with said receiver system response.

5. A method for simultaneous calibration of a geophysical prospecting system, comprising:
   generating a source signal of selected frequency for input to an earth medium;
   detecting a source input replica electrical data signal;
   injecting a calibration signal of precisely known frequency into the data signal, said calibration signal having amplitude and phase spectra in the frequency domain which are interleaving and non-interfering with the amplitude and phase spectra of the data signal in the frequency domain;
   processing the combined data signal and calibration signal to derive a source system response; and
   correcting the source input replica data signal in accordance with said system response indication;
   said step of processing further comprising:
   Fourier transforming the combined data signal and calibration signal to produce a respective data complex spectrum and calibration complex spectrum; and dividing the calibration complex spectrum by an ideal square wave complex spectrum to obtain said system response.

6. A method as set forth in claim 5 wherein said step of correcting comprises:

interpolating the system response at calibration frequencies to a system response at data frequencies; and dividing the data complex spectrum by the interpolated system response to obtain a corrected data signal complex spectrum.

7. A method for simultaneous calibration of a geophysical prospecting receiver system, comprising:

detecting an input data signal;

injecting a calibration signal of precisely known frequency into the data signal, said calibration signal having amplitude and phase spectra in the frequency domain which are interleaving and non-interfering with the amplitude and phase spectra of the data signal in the frequency domain;

processing the combined data signal and calibration signal to derive a system response; and correcting the data signal to account for said system response;

said step of processing further comprising:

Fourier transforming the combined data signal and calibration signal to produce a respective data complex spectrum and calibration complex spectrum; and dividing the calibration complex spectrum by an ideal square wave complex spectrum to obtain said system response.

8. A method as set forth in claim 7 wherein said step of correcting comprises:

interpolating the system response at calibration frequencies to a system response at data frequencies; and dividing the data complex spectrum by the interpolated system response to obtain a corrected data signal complex spectrum.

9. A method for simultaneous calibration of an electrical signal measuring system, comprising:

sensing and inputting a data signal;

injecting a calibration signal into the data signal that has interleaving and non-interfering amplitude and phase spectra in the frequency domain, and has precisely known frequency characteristics;

Fourier transforming the combined data signal and calibration signal to obtain the data complex spectrum and the calibration complex spectrum;

dividing the calibration complex spectrum by an ideal calibration complex spectrum to obtain the complex system response;

interpolating the complex system response at calibration frequencies to a complex system response at data signal frequencies; and dividing the data complex spectrum by the interpolated data signal complex system response to obtain a calibration corrected data signal complex spectrum.

10. A method as set forth in claim 9 which further includes the step of:

Fourier transforming said corrected data signal complex spectrum to a corrected data signal in the time domain.

11. A method as set forth in claim 9 wherein:

said calibration signal is a square wave.

12. A method as set forth in claim 9 wherein:

said calibration signal has a frequency of one-half the data signal frequency.

13. A method as set forth in claim 12 wherein:

said calibration signal is a square wave.

* * * * *